United States Patent
Li et al.

(10) Patent No.: US 9,520,976 B2
(45) Date of Patent: Dec. 13, 2016

(54) MOBILE COMMUNICATION METHOD, WIRELESS BASE STATION AND MOBILE STATION

(71) Applicant: NTT DoCoMo, Inc., Tokyo (JP)

(72) Inventors: Anxin Li, Beijing (CN); Atsushi Harada, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 14/322,265

(22) Filed: Jul. 2, 2014

(65) Prior Publication Data
US 2015/0009911 A1    Jan. 8, 2015

(30) Foreign Application Priority Data

Jul. 5, 2013  (CN) .......................... 2013 1 0282364

(51) Int. Cl.
*H04L 5/00*    (2006.01)

(52) U.S. Cl.
CPC ........... *H04L 5/0053* (2013.01); *H04L 5/0037* (2013.01); *H04L 5/0016* (2013.01); *H04L 5/0073* (2013.01)

(58) Field of Classification Search
CPC .... H04L 5/0053; H04L 5/0037; H04L 5/0016; H04L 5/0073
USPC ....... 370/310, 328, 329, 340, 241, 345, 347, 370/348, 431, 436, 437; 455/403, 422.1, 455/450, 452.1, 462, 464, 39, 500, 507, 455/509
See application file for complete search history.

(56) References Cited

U.S. PATENT DOCUMENTS

| | | | |
|---|---|---|---|
| 2010/0172308 A1 | 7/2010 | Nam et al. | |
| 2011/0170499 A1* | 7/2011 | Nayeb Nazar et al. | 370/329 |
| 2011/0299508 A1* | 12/2011 | Suzuki | 370/336 |
| 2013/0135984 A1* | 5/2013 | Choi et al. | 370/209 |

FOREIGN PATENT DOCUMENTS

| | | |
|---|---|---|
| EP | 2 566 269 A1 | 3/2013 |
| WO | WO 2009057039 A2 * | 5/2009 |
| WO | 2011/126435 A1 | 10/2011 |

OTHER PUBLICATIONS

Extended Search Report, European Patent Application No. 14175731.0, Nov. 6, 2014.

* cited by examiner

*Primary Examiner* — Obaidul Huq
(74) *Attorney, Agent, or Firm* — Harness, Dickey & Pierce, P.L.C.

(57) ABSTRACT

The embodiments of the present invention provide a mobile communication method, a wireless base station and a mobile station. The mobile communication method according to the embodiment of the present invention is applied to the wireless base station. The method comprises: determining resource group offset information used for a mobile station; offsetting an initial physical channel resource group allocated to the mobile station according to the resource group offset information; determining cyclic shift information of demodulation reference signal used for the mobile station according to unused physical channel resources in the offset physical channel resource group; and transmitting the resource group offset information and the cyclic shift information to the mobile station.

17 Claims, 5 Drawing Sheets

MOBILE COMMUNICATION METHOD, WIRELESS BASE STATION AND MOBILE STATION

TECHNICAL FIELD

The present invention relates to a mobile communication method, a wireless base station and a mobile station, and more specifically, the present invention relates to a mobile communication method, a wireless base station and a mobile station for determining physical channel resource allocated to the mobile station.

BACKGROUND

In a Long Term Evolution (LTE) communication system and a LTE-Advanced communication system, it is allowed to simultaneously schedule a plurality of mobile stations in order to increase the capacity of the communication systems. In a wireless communication system, physical resources in frequency and code domains may be multiplexed in order to realize to simultaneously transmit signaling to a plurality of mobile stations. For example, in the resource blocks of the frequency and code domains, different cyclic shifts of Demodulation Reference Signal (DMRS) may be used to differentiate a plurality of mobile stations, so that a plurality of mobile stations can use different physical resources in the same physical resource block and therefore simultaneously transmitting signals to a plurality of mobile stations is realized.

However, DMRS only comprises 8 different cyclic shift values. That is, in the present existing LTE and LTE-Advanced systems, even though, in frequency and code domains, the different cyclic shifts of DMRS are used to differentiate mobile stations, it can only be allowed that signals are simultaneously transmitted to a maximum of 8 mobile stations. This causes that there may be, within the physical resource block, idle physical channel resources not allocated to the mobile stations. On the other hand, as new wireless access technologies are proposed, the number of simultaneously scheduled mobile stations, which can be supported by the wireless base station, is increasing. For example, in a None-Orthogonal Multiple Access (NOMA) system extended by utilizing Multiple Input & Multiple Output (MIMO), it is allowable for the wireless base station to simultaneously schedule more than 8 mobile stations. In this case, it is hard for present existing allocation mechanisms for the physical channel resources to meet scheduling needs.

SUMMARY OF THE INVENTION

In views of the above problems, it is desired to provide a mobile communication method, a wireless base station and a mobile station so as to improve availability of wireless resources.

According to an embodiment of the present invention, there is provided a mobile communication method applied to a wireless base station. The mobile communication method comprises: determining resource group offset information used for a mobile station; offsetting an initial physical channel resource group allocated to the mobile station according to the resource group offset information; determining cyclic shift information of demodulation reference signal used for the mobile station according to unused physical channel resources in the offset physical channel resource group; and transmitting the resource group offset information and the cyclic shift information to the mobile station.

According to another embodiment of the present invention, there is provided a mobile communication method applied to a mobile station. The mobile communication method comprises: receiving a signaling from a wireless base station; obtaining cyclic shift information of demodulation reference signal and resource group offset information of the mobile station according to the received signaling; determining physical channel resource which the mobile station uses for receiving response information from the wireless base station according to the resource group offset information and the cyclic shift information.

According to another embodiment of the present invention, there is provided a mobile communication method applied to a wireless communication system. The mobile communication method comprises: determining resource group offset information used for a mobile station through a wireless base station; offsetting an initial physical channel resource group allocated to the mobile station according to the resource group offset information through the wireless base station; determining cyclic shift information of demodulation reference signal used for the mobile station according to unused physical channel resources in the offset physical cannel resource group through the wireless base station; transmitting the resource group offset information and the cyclic shift information to the mobile station through the wireless base station; receiving a signaling transmitted from the wireless base station through the mobile station; obtaining the cyclic shift information of the demodulation reference signal and the resource group offset information of the mobile station according to the received signaling through the mobile station; determining physical channel resource which the mobile station uses for receiving response information from the wireless base station according to the resource group offset information and the cyclic shift information through the mobile station.

According to another embodiment of the present invention, there is provided a wireless base station, comprising: a resource group offset information determination unit, configured to determine resource group offset information used for a mobile station; resource group offset unit, configured to offset an initial physical channel resource group allocated to the mobile station according to the resource group offset information; an cyclic shift information determination unit, configured to determine an cyclic shift information of an demodulation reference signal used for the mobile station according to unused physical channel resources in the offset physical channel resource group; and a transmitting unit, configured to transmit the resource group offset information and the cyclic shift information to the mobile station.

According to another embodiment of the present invention, there is provided a mobile station, comprising: a receiving unit, configured to receive a signaling transmitted from a wireless base station; a information obtaining unit, configured to obtain cyclic shift information of demodulation reference signal and resource group offset information of the mobile station according to the received signaling; and a physical channel resource determination unit, configured to determine physical channel resource which the mobile station uses for receiving response information from the wireless base station according to the resource group offset information and the cyclic shift information.

Comparing with the present existing allocation mechanisms for the physical resource, more users can be multiplexed on the same physical resource block through the solutions according to the embodiments in the present invention. In addition, through the solutions according to the embodiments in the present invention, the number of the mobile stations allocated to each physical resource block can be adjusted, so that when the number of the mobile stations allocated to the same physical resource block is larger, a portion of the mobile stations are adjusted to occupy the physical channel resources in the other physical resource blocks.

DETAILED DESCRIPTION

Hereinafter, the preferred embodiments of the present invention will be described in detail with reference to the accompanying drawings. It should be noted that in the present description and drawings, substantially identical steps and elements are indicated by identical reference numbers, and the repeated description thereof will be omitted. Furthermore, in the following embodiments of the present invention, a plurality of physical channel resources can be included in one physical resource block, and an initial physical channel resource group allocated to the mobile station by the wireless base station can include a portion of physical channel resources in the physical resource block. Moreover, a shift amount may take the physical channel resources as a unit.

Figure 1:
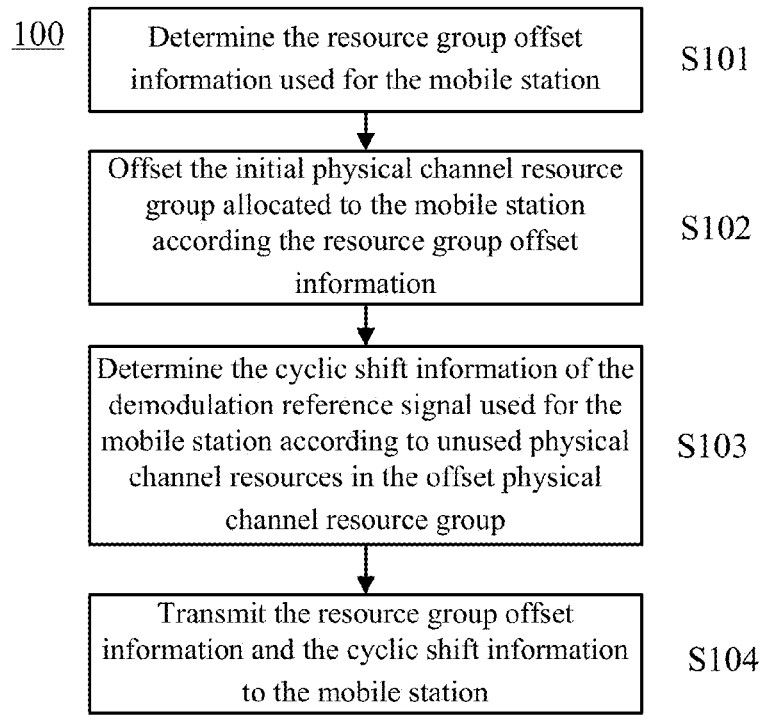
FIG. 1 illustrates a flowchart of mobile communication method according to one embodiment of the present invention.

FIG. 1 illustrates a flowchart of a mobile communication method 100 according to an embodiment of the present invention. The mobile communication method 100 can be applied to the wireless base station. Hereinafter, the mobile communication method 100 according to the embodiment of the present invention will be described with reference to FIG. 1.

As shown in FIG. 1, in Step S101, the resource group offset information used for the mobile station is determined. Then, in Step S102, the initial physical channel resource group allocated to the mobile station is offset according to the resource group offset information. Preferably, in Step S102, when the wireless communication system uses the multiplexing manners of both frequency division multiplexing and code division multiplexing, the physical channel resource group initially allocated to the mobile station may be offset only in frequency domain according to the resource group offset information.

According to an example of the present invention, in Step S101, the order of Downlink Control Information (DCI) of the mobile station in scheduling grant signaling (UL grant) can be determined, and the resource group offset information of the offset shift amount of the initial physical channel resource group, is determined according to the order of DCI in the scheduling grant signaling. For example, the order of DCI in the scheduling grant signaling may be directly used as the shift amount, or the shift amount may be obtained through a particular algorithm according to the order of DCI in the scheduling grant signaling. For the sake of brevity, hereinafter, the order of DCI in the scheduling grant signaling will be referred to as DCI order.

In Step S102, the initial physical channel resource group initially allocated to the mobile station by the wireless base station can be offset the shift amount indicated by the resource group offset information. Thus, the wireless base station can change position of the physical channel resource group allocated to the mobile station without using additional parameters.

However, because the value of DCI order is usually smaller, the initial physical channel resource group of the mobile station can only be offset within a small range by using the value of DCI order as the shift amount. When the number of the existing (legacy) mobile stations of the initial physical resource block where the initial physical channel resource group occupying the mobile station is located or the other resource blocks adjacent to the said initial physical resource block is greater than or equal to a predetermined number of the mobile stations, in the case that the initial physical channel resource group is offset by using DCI order, the offset initial physical channel resource group may also conflict with physical resources occupied by the existing mobile stations in the initial physical resource block and other resource blocks adjacent to the said initial physical resource block, resulting that there is no idle channel that can be used by the mobile station in the offset initial physical channel resource group.

In order to adjust the position of the initial physical channel resource group in a larger range, according to another example of the present invention, in Step S101, the DCI order of the mobile station can be determined, and a first shift information that indicates a offset first shift amount of the initial physical channel resource group is determined according to the DCI order, and a second shift information of the mobile station is determined, and then the first shift information and the second shift information are used as the resource group offset information for the mobile station, that is, besides the initial physical channel resource group is offset based on the DCI order, the initial physical channel resource group is also offset based on the second shift information to expand the offset range of the initial physical channel resource group.

For example, the second shift information can be an absolute position indicating information. Specifically, the absolute position indicating information can indicate a target physical resource block to which the initial physical channel resource group is offset. Because Physical Uplink Control Channel (PUCCH) in uplink subframes does not need a corresponding indicating channel thereof, that is, the physical channel resource of the indicating channel corresponding to PUCCH is idle, the target physical resource block indicated by the absolute position indicating information can preferably be one of the physical resource blocks which are allocated to the indicating channel of PUCCH in the uplink subframes. For example, the indicating channel corresponding to PUCCH in the uplink subframes may be a physical HARQ indicating channel.

Furthermore, according an example of the present invention, the wireless base station can preset, for each physical resource block, the target physical resource block to which the said physical resource block has to be offset, when the initial physical channel resource group of the mobile station is located at the said physical resource block, and can generate the absolute position indicating information according to the target physical resource block set for each physical resource block. Alternatively, according another example of the present invention, the wireless base station can separately determine, for each mobile station, the absolute position indicating information that indicates the target physical resource block to which the initial physical resource group of the said mobile station has to be offset. This will be further described later in combination with FIG. 3.

Furthermore, the wireless base station can also determine the specific physical resource block to which the initial physical channel resource group of the current mobile station is offset according to the circumstance that the previous indicating channel of the PUCCH is allocated to the mobile station. In Step 102, the initial physical channel resource group allocated to the mobile station can be offset to the target physical resource block. Then, in the target physical resource block, the initial physical channel resource group is further offset by the first shift amount.

As another example, the second shift information may be a relative position indicating information. Specifically, the relative position indicating information indicates an offset second shift amount of the initial physical channel resource group. The wireless base station may determine the second shift amount according to the number of the existing mobile stations allocated to each physical resource block, so that the offset initial physical channel resource group is located at the physical resource block where the number of the existing mobile stations is smaller or there is no existing mobile station. The physical resource block where the number of the existing mobile stations is smaller can be the physical resource block where the indicating channel corresponding to Physical Uplink Shared Channel (PUSCH) is located, and as discussed above, the physical resource block where there is no existing mobile station may be the physical resource block where the indicating channel corresponding to PUCCH is located. In Step S102, the first shift amount and the second shift amount can be added up so as to obtain a third shift amount, and then the initial physical channel resource group is offset by the third shift amount.

Preferably, when there are a plurality of mobile stations, the number of the mobile stations which use the absolute position indicating information and the number of the mobile stations using relative position indicating information can be determined according to the number of the Physical Uplink Control Channels (PUCCH) in the uplink subframes. For example, when the number of the PHCCH is larger than or equal to the predetermined number of the PUCCH, in all of the mobile stations which communicate with the wireless base station, the second shift information of the mobile stations that occupies a first proportion of the total number of the mobile stations can be set as the absolute position indicating information; and when the number of the PUCCH is smaller than the predetermined number of the PUCCH, in all of the mobile stations which communicate with the wireless base station, the second shift information of the mobile stations that occupies a second proportion of the total number of the mobile stations can be set as the absolute position indicating information, wherein the first proportion is larger than the second proportion. That is, the more the number of the PUCCH in the uplink subframes is, the more the number of the mobile stations whose second shift information is set as the absolute position indicating information by the wireless base station is, and the less the number of the mobile stations whose second shift information is set as the relative position indicating information by the wireless base station is; while the less the number of the PUCCH in the uplink subframes, the less the number of the mobile stations whose second shift information is set as the absolute position indicating information by the wireless base station is, and the more the number of the mobile stations whose second shift information is set as the relative position indicating information by the wireless base station is.

Then, in Step S103, according to unused physical channel resources in the offset physical channel resource group, the cyclic shift information of the demodulation reference signal used for the mobile station is determined. At last, in Step S104, the resource group offset information and the cyclic shift information are transmitted to the mobile station.

According to an example of the present invention, the DCI order and the cyclic shift information can be informed to the mobile station through the scheduling grant signaling. Furthermore, according to another example of the present invention, in the case that the resource group offset information includes the second shift information discussed above, the base station can transmit the said second shift information to the mobile station through a Radio Resource Control (RRC) signaling. In this case, in Step S104, the said second shift information can be first transmitted to the mobile station through the RRC signaling, and then the DCI order and the cyclic shift information can be informed to the mobile station through the scheduling grant signaling.

Furthermore, according to another example of the present invention, after the wireless base station transmits the resource group offset information and the cyclic shift information to the mobile station so that the mobile station determines the physical channel resource which the mobile station can use, the method illustrated in FIG. 1 can also include transmitting, to the mobile station, response information for a signal from the mobile station, through the physical channel resource which is determined according to the resource group offset information and the cyclic shift information of the mobile station.

Figure 2:
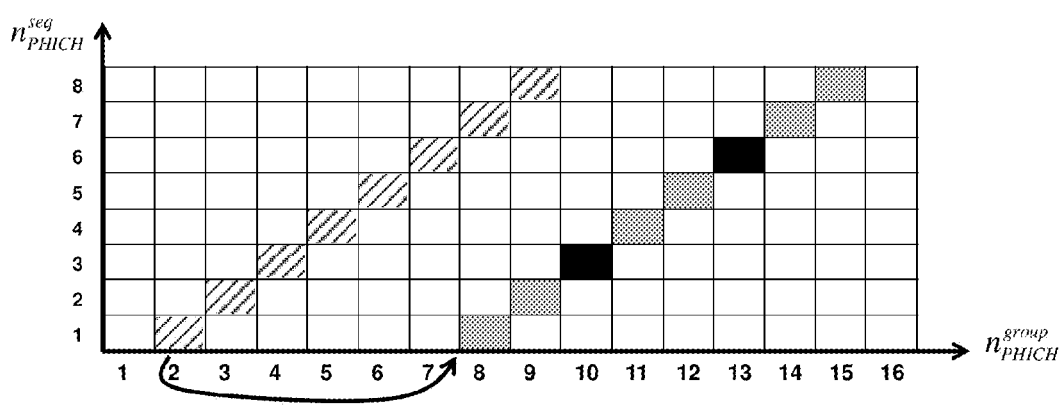
FIG. 2 illustrates a description view of an exemplary circumstance of the mobile communication method illustrated in FIG. 1.

FIG. 2 illustrates a description view of an exemplary circumstance of the mobile communication method illustrated in FIG. 1. In the coordinate system shown in FIG. 2, the abscissa $n_{PHICH}^{group}$ denotes dimensionality of the frequency domain, and the ordinate $n_{PHICH}^{seq}$ denotes dimensionality of the code domain. Moreover, it is assumed that in the example shown in FIG. 2, the wireless base station determines the DCI order of the mobile station as "1".

As shown in shaded parts of FIG. 2, the initial physical channel resource group allocated to the mobile station by the wireless base station includes physical channel resources n(i, j), wherein i=2, 3, . . . 9, j=i−1, and i and j are integers. The wireless base station can determine the DCI order of the mobile station, and determine the first shift information according to the DCI order, wherein the first shift information indicates the first shift amount "1" by which the initial physical channel resource group will be offset. The wireless base station can also determine the relative position indicating information of the mobile station as the second shift information. In the case shown in FIG. 2, the wireless base station determines the second shift amount indicated by the relative position indicating information as "5" according to usage condition of the physical channel resources in the current wireless communication system.

Then, the wireless base station can add the first shift amount "1" to the second shift amount "5" so as to obtain the third shift amount "6", and as shown by the arrow in FIG. 2, the abscissa (i.e., in the frequency domain) of the initial physical channel resource group allocated to the mobile station is moved by the third shift amount to obtain the offset initial physical channel resource group n (i', j'), wherein i'=8, 9, . . . 15, j'=i-7, and i' and j' are integers.

As shown in black regions of FIG. 2, in the offset initial physical channel resource group, the channel resources n(10, 3) and n(13, 6) have been occupied by other mobile stations. Therefore, the wireless base station sets the physical channel resource that should be used by the current mobile station in the physical channel resources, which is not occupied by other mobile stations, in the offset initial physical channel resource group (as shown in gray regions of the FIG. 2), and determines the cyclic shift information of the demodulation reference signal used for the mobile station according to the set physical channel resource which should be used by the current mobile station. At last, the wireless base station transmits the cyclic shift information and the resource group offset information which includes the first shift information and the second shift information to the mobile station.

In FIG. 2, the description is carried out by taking an example that the second shift information in the resource group offset information is the relative position indicating information. In the case that the second shift information in the resource group offset information is the absolute position indicating information, starting physical channel resource, e.g. physical channel resource n (2, 1) in the initial physical channel resource group shown in FIG. 2, in the initial physical channel resource group allocated to the mobile station can be predetermined. When, as discussed above, the initial physical channel resource group allocated to the mobile station is offset to the target physical resource block, the starting physical channel resource can be offset into the target physical resource block, and other physical channel resources in the initial physical channel resource group are sequentially moved according to the moved position of the starting physical channel resource.

Figure 3:
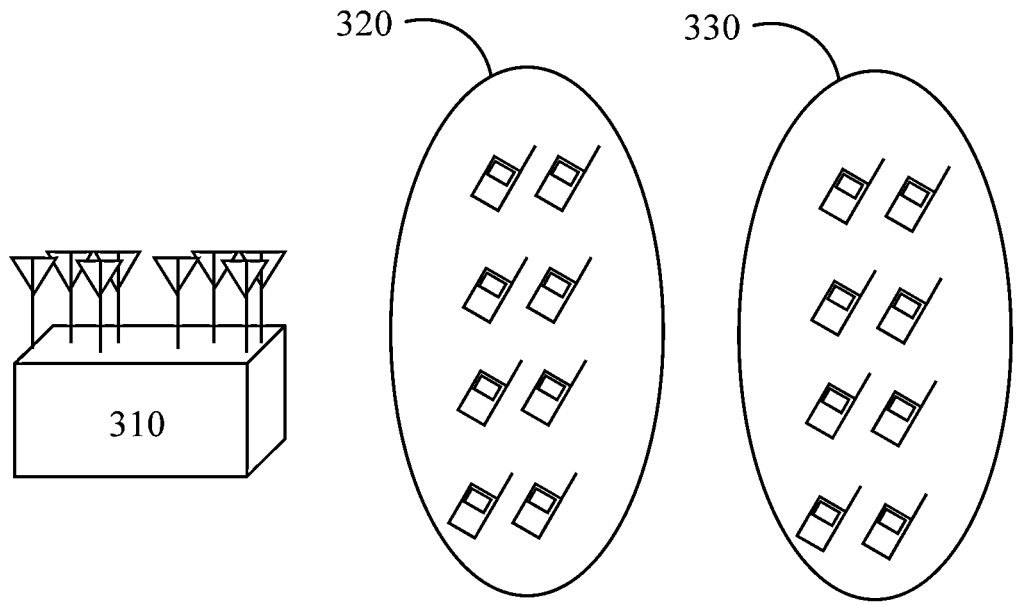
FIG. 3 illustrates a description view of an exemplary circumstance that the wireless base station, in the wireless communication system, uses the mobile communication method illustrated in FIG. 1.

FIG. 3 illustrates a description view of an exemplary circumstance that a wireless base station 310, in a wireless communication system, uses the mobile communication method illustrated in FIG. 1. In the wireless communication system shown in FIG. 3, the wireless base station 310 can simultaneously schedule the mobile stations included in a first user group 320 and a second user group 330. According to an example of the present invention, the wireless base station 310 can use present existing allocation mechanisms for the physical channel resources to allocate the physical channel resources for the mobile stations included in the first user group 320, and can use the communication method shown in FIG. 1 to allocate the physical channel resources for the mobile stations included in the second user group 330, so as to avoid confliction between the physical channel resources used by the mobile stations included in the second user group 330 and the physical channel resources used by the mobile stations included in the first user group 320.

In the example shown in FIG. 3, the wireless base station 310 can number the mobile stations in the second user group 330 as the DCI order of the mobile stations in the second user group 330. That is, the DCI order of each mobile station in the second user group 330 can be one value among 1-8, and the DCI orders of respective mobile stations are different from each other.

Furthermore, when the resource group offset information includes the second shift information and the second shift information is an absolute position indicating information, the wireless base station can preset, for each physical resource block, the target physical resource block to which the physical resource block has to be offset, when the initial physical channel resource group of the mobile station is located at the said physical resource block. When the resource group offset information used for the mobile stations of the second user group 330 is determined, the wireless base station can determine the initial physical resource block where the initial physical channel resource group allocated to each mobile station is located, and generate the absolute position indicating information which indicates the target physical resource block of the initial physical resource block as the second shift information in the resource group offset information of the said mobile station according to the above discussed target physical resource block preset for the initial physical resource block. Alternatively, when the resource group offset information used for the mobile station is determined, wireless base station can separately determine, for each mobile station in the second user group 330, the absolute position indicating information which indicates the target physical resource block to which the initial physical group of the said mobile station has to be offset.

Furthermore, when the resource group offset information includes the second shift information and the second shift information is relative position indicating information, when the resource group offset information used for the mobile stations is determined, the wireless base station can also determine, for all of the mobile stations in the second user group 330, the same relative position indicating information as the second shift information. In this case, the initial physical resource group of all of the mobile stations in the second user group 330 may have the same second shift amount, so as to simply operations of the wireless base station, and because the initial physical resource groups of respective mobile stations are not only offset by the second shift amount but also offset by the first shift amount indicated by the DCI order of each mobile station, the positions of the offset initial physical resource groups of the mobile stations in the second user group 330 are different.

Figure 4:
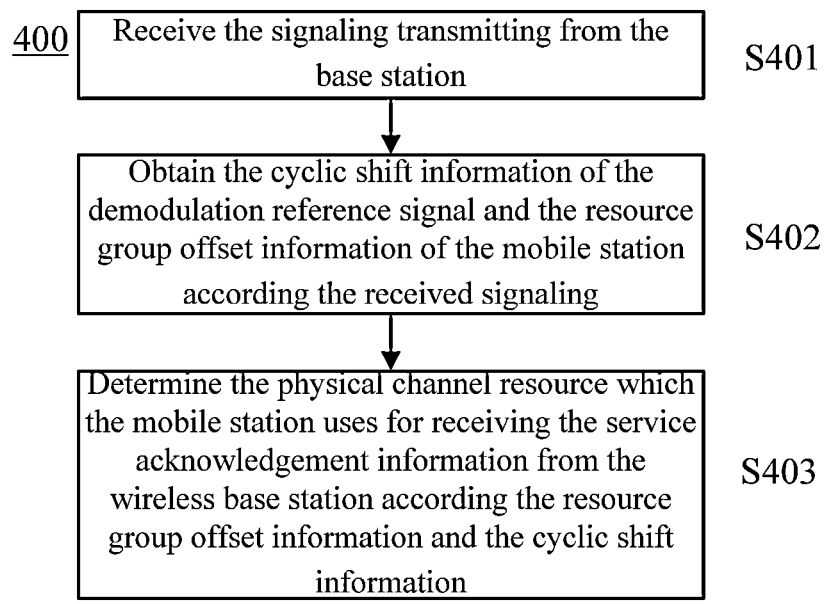
FIG. 4 illustrates a flowchart of mobile communication method according to another embodiment of the present invention.

FIG. 4 illustrates a flowchart of a mobile communication method 400 according to another embodiment of the present invention. The mobile communication method 400 can be applied to a mobile station. Hereinafter, the mobile communication method 400 according to the embodiment of the present invention will be described with reference to FIG. 4.

As shown in FIG. 4, in Step S401, a signaling transmitted from the wireless base station is received. In Step S402, the cyclic shift information of demodulation reference signal and the resource group offset information of the mobile station are obtained according to the received signaling. Then, in Step S403, the physical channel resource which the mobile station uses for receiving response information from the wireless base station are determined according to the resource group offset information and the cyclic shift information. Preferably, when the wireless communication system uses the multiplexing manners of both frequency division multiplexing and code division multiplexing, the initial physical channel resource group allocated to the mobile station can be offset only in the frequency domain according to the resource group offset information in Step S403.

According to an example of the present invention, in Step S402, the DCI order of the mobile station can be obtain according to the received signaling, and the resource group offset information can be determined according to the DCI order. In Step S403, the physical channel resource which the mobile station uses for receiving the response information from the wireless base station may be obtained by moving the initial physical channel resource group, which is initially allocated to the mobile station by the wireless base station, by the shift amount indicated by the DCI order. Thus, without receiving additional parameters, the mobile station can determine the offset of the initial physical channel resource group initially allocated to the said mobile station by the wireless base station, and can further determine the physical channel resource used for receiving the response information from the wireless base station in the offset initial physical channel resource group.

More specifically, for example, the position $n_{PHICH}^{group}$ of the physical channel resources which the mobile stations use for receiving the response information from the wireless base station can be determined through the following Equation (1):

$$n_{PHICH}^{group} = (I_{PRB\_RA} + N_{DCI\ order} + n_{DMRS}) \bmod N_{PHICH}^{group} \quad \text{Equation (1)}$$

wherein, $I_{PRB\_RA}$ is an index of the lowest physical resource block of PUSCH or the second lowest physical resource block of PUSCH, and the position of the starting physical channel resource in the initial physical channel resource group allocated to the mobile station can be obtained by calculation through $I_{PRB\_RA}$ (for example, calculated through the Equation (1) when $N_{DCI\ order}$ and $n_{DMRS}$ are 0); $N_{DCI\ order}$ is a value of the DCI order of the mobile station; $n_{DMRS}$ is a cyclic shift value of the demodulation reference signal of the mobile station; $N_{PHICH}^{group}$ is the number of the physical resource blocks.

However, as discussed above, because the value of the DCI order is usually smaller, when the wireless base station desires to offset the initial physical channel resource group of the mobile station by a larger shift, it is not enough to indicate the position of the offset initial physical channel resource group only by the DCI order.

In order to solve the above problem, according to another example of the present invention, in Step S402, the first shift information and the second shift information can be obtained as the resource group offset information according the received signaling, so that when the wireless base station adjusts the position of the initial physical channel resource group with in a larger range, the offset initial physical channel resource group is determined at the mobile station side, wherein the first shift information is the DCI order of the mobile station, and the offset first shift amount of the initial physical channel resource group of the mobile station is determined according the DCI order.

For example, the second shift information can be the absolute position indicating information. Specifically, the absolute position indicating information can indicate the target physical resource block to which the initial physical channel resource group is offset. Because PUCCH in the uplink subframes does not need a corresponding indicating channel thereof, that is, the physical channel resource of the indicating channel corresponding to PUCCH is idle, the target physical resource block indicated by the absolute position indicating information can be one of the physical resource blocks which are allocated to the indicating channel of PUCCH in uplink subframes. In Step S403, the initial physical channel resource group allocated to the mobile station can be offset to the target physical resource block. Then, the initial physical channel resource group is further moved by the first shift amount in the target physical resource block. At last, the physical channel resource is determined in the offset physical channel resource group according to the received cyclic shift information.

More specifically, for example, the position $n_{PHICH}^{group}$ of the physical channel resources which the mobile stations use for receiving the response information from the wireless base station can be determined through the following Equation (2):

$$n_{PHICH}^{group} = (N_{DCI\ order} + N_{offset}^{absolute} + n_{DMRS}) \bmod N_{PHICH}^{group} \quad \text{Equation (2)}$$

wherein, $N_{DCI\ order}$ is a value of the DCI order of the mobile station; $N_{offset}^{absolute}$ set is a value of the absolute position indicating information; $n_{DMRS}$ is a cyclic shift value of demodulation reference signal of the mobile station; $N_{PHICH}^{group}$ is the number of the physical resource blocks.

As another example, the second shift information can be the relative position indicating information. Specifically, the relative position indicating information indicates the second shift amount by which the initial physical channel resource group is offset. The second shift amount can indicate the physical resource block where the number of the existing mobile stations is smaller or there is no existing mobile station. The physical resource block where the number of the existing mobile stations is smaller can be the resource block where the indicating channel corresponding to PUSCH is located, and as discussed above, the physical resource block where there is no existing mobile station may be the resource block where the indicating channel corresponding to PUCCH is located. In Step S403, the first shift amount and the second shift amount can be added up so as to obtain the third shift amount, and then the initial physical channel resource group is offset by the third shift amount, and the physical channel resource is determined in the offset physical channel resource group according to the cyclic shift information.

More specifically, for example, the position $n_{PHICH}^{group}$ of the physical channel resources which the mobile stations use for receiving the response information from the wireless base station can be determined through the following Equation (3):

$$n_{PHICH}^{group} = (I_{PRB\_RA} + N_{DCI\ order} + N_{offset}^{random} + n_{DMRS}) \bmod N_{PHICH}^{group} \quad \text{Equation (3)}$$

wherein, $I_{PRB\_RA}$ is an index of the lowest physical resource block of PUSCH or the second lowest physical resource block of PUSCH, and the position of the starting physical channel resource in the initial physical channel resource group allocated to the mobile station can be obtained by calculation through $I_{PRB\_RA}$ (for example, calculated through the Equation (1) when $N_{DCI\ order}$ and $n_{DMRS}$ are 0); $N_{DCI\ order}$ is a value of the DCI order of the mobile station; $N_{offset}^{random}$ is a value of the relative position indicating information; $n_{DMRS}$ is a cyclic shift value of the demodulation reference signal of the mobile station; $N_{PHICH}^{group}$ is the number of the physical resource blocks.

According to an example of the present invention, a scheduling grant signaling can be received in Step S401. Then, in Step S402, the DCI order and the cyclic shift information of the mobile station can be obtained from the scheduling grant signaling. Furthermore, according to another example of the present invention, in the case that the resource group offset information includes the above discussed second shift information, a RRC signaling can be received in Step S401. Then, in Step S402, the second shift information can be obtained according to the received RRC signaling. In this case, the Step S401 and the Step S402 shown in FIG. 4 can be repeated. Specifically, the mobile station can first receive the RRC signaling, and obtain the second shift information according to the received RRC signaling. Then, the scheduling grant signaling can be received, and the first shift information can be obtained according to the received scheduling grant signaling. At last, the physical channel resource which the mobile station uses for receiving the response information from the wireless base station is determined according to the first shift information, the second shift information and the cyclic shift information.

Figure 5:
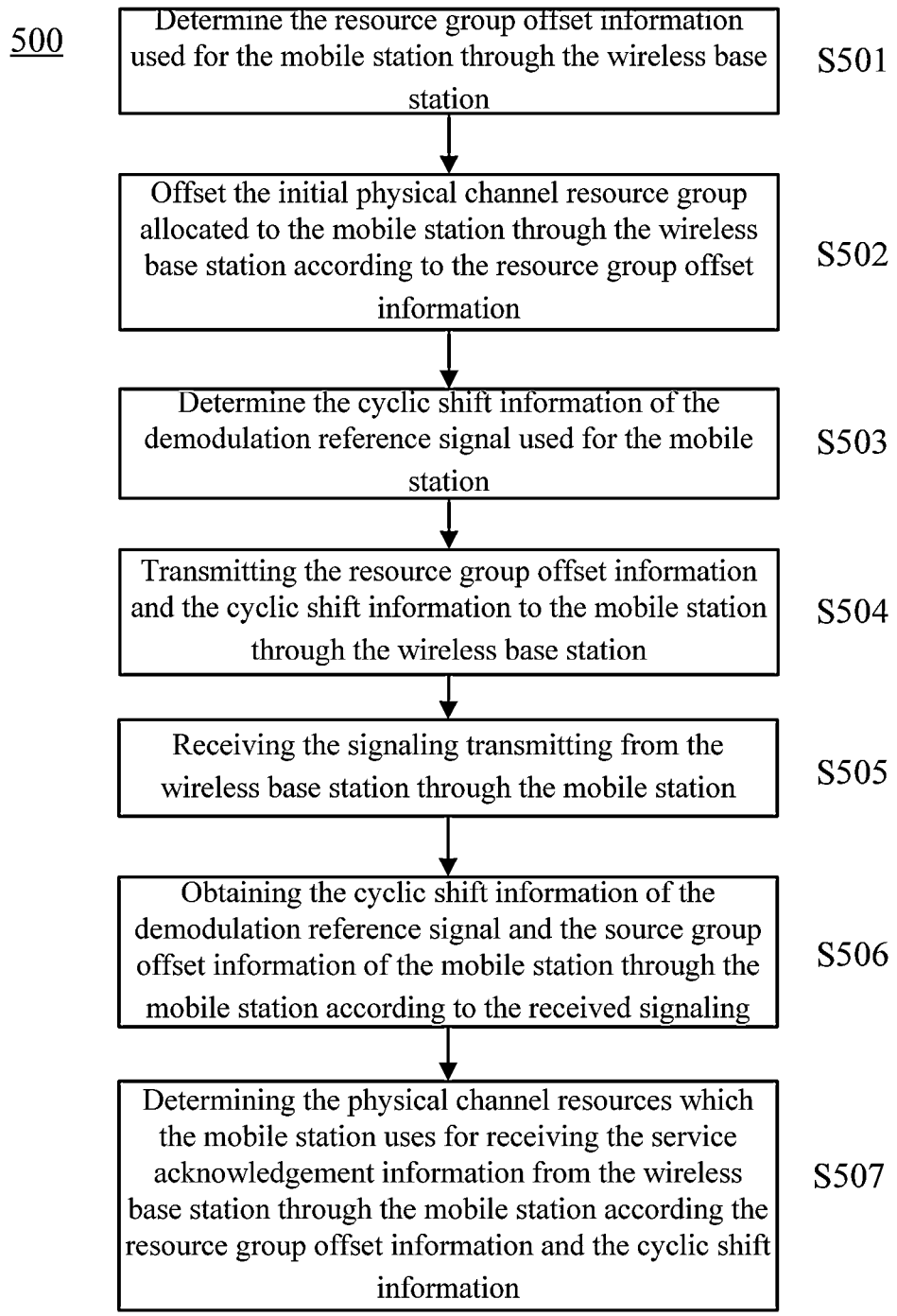
FIG. 5 illustrates a flowchart of mobile communication method according to still another embodiment of the present invention.

FIG. 5 illustrates a flowchart of a mobile communication method 500 according to still another embodiment of the present invention. The mobile communication method 500 can be applied to a wireless communication system that includes wireless base stations and mobile stations. The mobile communication method 500 shown in FIG. 5 includes the methods shown in FIG. 1 and FIG. 4, and therefore, the following description only describes the main steps of the mobile communication method 500 while the detail content that has been described above in combination with FIG. 1 and FIG. 4 will be omitted.

As shown in FIG. 5, in Step S501, the resource group offset information used for the mobile stations is determined through the wireless base station. Then, in Step S502, the initial physical channel resource group allocated to the mobile station is offset through the wireless base station according the resource group offset information. In Step S503, the cyclic shift information of the demodulation reference signal used for the mobile station is determined through the wireless base station according unused physical channel resources in the offset physical channel resource group. Then, in Step S504, the resource group offset information and the cyclic shift information are transmitted to the mobile station through the wireless base station. Thereafter, the wireless base station can transmit, to the mobile station, response information for the signal from the mobile station through the physical channel resource of the mobile station determined by the resource group offset information and the cyclic shift information.

In Step S505, a signaling transmitted from the wireless base station is received through the mobile station. In Step 506, the cyclic shift information of demodulation reference signal and the resource group offset information of the mobile station are obtained according to the received signaling through the mobile station. Then, in Step S507, the physical channel resource which the mobile station uses for receiving the response information from the wireless base station is determined according to the resource group offset information and the cyclic shift information through the mobile station.

Preferably, when the wireless communication system uses the multiplexing manners of both frequency division multiplexing and code division multiplexing, in Step S502, the physical channel resource group initially allocated to the mobile station can be offset only in the frequency domain according to the resource group offset information. Furthermore, in Step S507, the physical channel resource group initially allocated to the mobile station can be offset only in the frequency domain according to the resource group offset information. After the mobile station determines the physical channel resource which the mobile station uses for receiving the response information from the wireless base station, the response information can be received from the wireless base station through the said physical channel resource.

Through the mobile communication methods in the above embodiments of the present invention, more users can be multiplexed in the same physical resource block, and the number of the mobile stations allocated to each physical resource block can be adjusted, so that when the number of the mobile stations allocated to the same physical resource block is larger, a portion of the mobile stations are adjusted to occupy physical channel resources of other physical resource blocks, so as to avoid confliction between the physical channel resources which respective mobile stations use.

Figure 6:
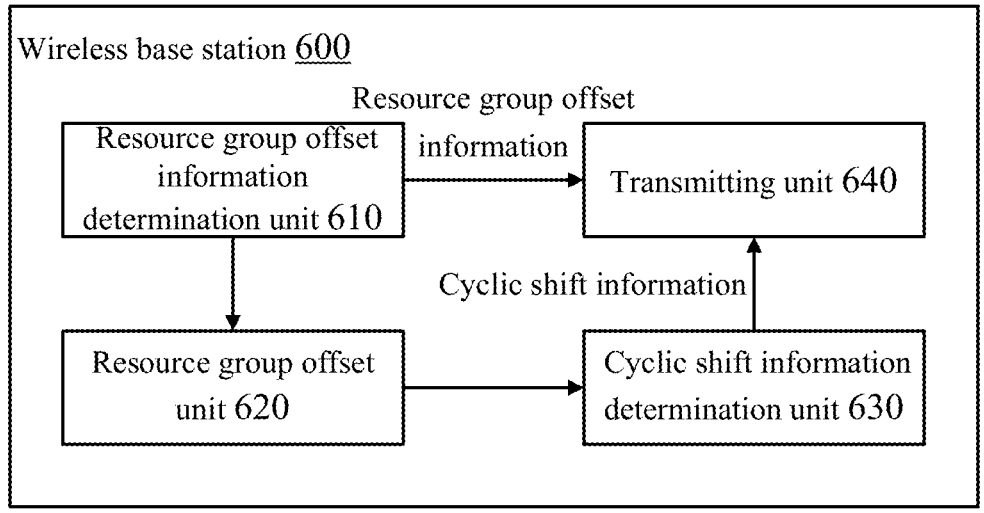
FIG. 6 illustrates a block diagram of an exemplary structure of the wireless base station according to an embodiment of the present invention.

Hereinafter, a wireless base station of an embodiment of the present invention will be described with reference to FIG. 6. FIG. 6 illustrates a block diagram of an exemplary structure of a wireless base station 600 according to the embodiment of the present invention. As shown in FIG. 6, the wireless base station 600 of the present embodiment includes a resource group offset information determination unit 610, a resource group offset unit 620, a cyclic shift information determination unit 630 and a transmitting unit 640. The respective units of the wireless base station 600 can separately perform each step/function of the mobile communication method 100 of the above FIG. 1. Therefore, the following description only describes the main components of the wireless base station 600 while the detail content that has been described above in combination with FIG. 1 will be omitted.

The resource group offset information determination unit 610 can determine the resource group offset information used for the mobile station. Then, the resource group offset unit 620 can offset initial physical channel resource group allocated to the mobile station according the resource group offset information. Preferably, when the wireless communication system uses the multiplexing manners of both frequency division multiplexing and code division multiplexing, the resource group offset unit 620 can offset, only in frequency domain, the physical channel resource group initially allocated to the mobile station according to the resource group offset information.

According to an example of the present invention, the resource group offset information determination unit 610 can determine the DCI order of the mobile station, and determine the resource group offset information which indicates the offset shift amount of the initial physical channel resource group according to the DCI order. The resource group offset unit 620 can move the initial physical channel resource group, which is initially allocated to the mobile station by the wireless base station, by the shift amount indicated by the DCI order. Thus, without receiving additional parameters, the mobile station can change the position of the physical channel resource group allocated to the mobile station.

Figure 7:
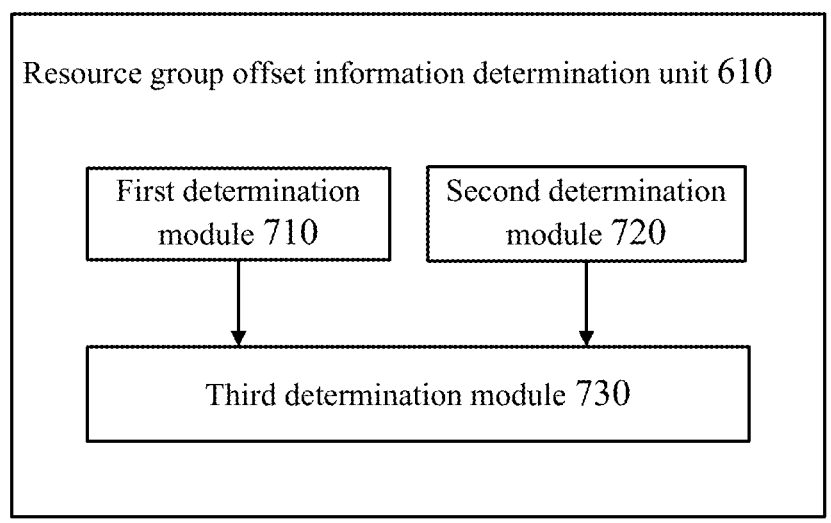
FIG. 7 illustrates a block diagram of an exemplary structure of resource group offset information determination unit according to an embodiment of the present invention.

Alternatively, according to another example of the present invention, the resource group offset information determination unit 610 can also determine, in addition to the DCI order, other information used for indicating the offset initial physical channel resource group in order to adjust the position of the initial physical channel resource group in a larger range. FIG. 7 illustrates a block diagram of an exemplary structure of resource group offset information determination unit 610 according to an embodiment of the present invention.

As shown in FIG. 7, the resource group offset information determination unit 610 can include a first determination module 710, a second determination module 720 and a third determination module 730. Specifically, the first determination module 710 can determine the DCI order of the mobile station, and determine the first shift information of the first shift amount by which the initial physical channel resource group is offset according to the DCI order. The second determination module 720 can determine the second shift amount of the mobile station. Then, the third determination module 730 can use the first shift information and the second shift information as the resource group offset information for the mobile station.

For example, the second shift information can be an absolute position indicating information. Specifically, the absolute position indicating information can indicate the target physical resource block to which the initial physical channel resource group is offset. Because PUCCH in the uplink subframes does not need a corresponding indicating channel thereof, that is, the physical channel resource of the indicating channel corresponding to PUCCH is idle, the target physical resource block indicated by the absolute position indicating information can be one of the physical resource blocks which are allocated to the indicating channel of PUCCH in uplink subframes. Furthermore, the second determination module 720 can also determine a specific physical resource block to which the initial physical channel resource group of the current mobile station is offset, according to the condition of the mobile station whose initial physical channel resource group has been offset to the physical channel resource of the indicating channel corresponding to the Physical Uplink Control Channel. The resource group offset unit 620 can offset the initial physical channel resource group allocated to the mobile station to the target physical resource block, and then, further move, in the target physical resource block, the initial physical channel resource group by the first shift amount.

Furthermore, according to an example of the present invention, the second determination module 720 can preset, for each physical resource block, the target physical resource block to which the initial physical channel resource has to be offset to when the initial physical channel resource group of the mobile station is located at the said physical resource block, and generate the target physical resource block according to the target physical resource block set for each physical resource block. Alternatively, according to another example of the present invention, the second determination module 720 can separately determine, for each mobile station, the absolute position indicating information that indicates the target physical resource blocks to which the initial physical resource group of the said mobile station has to be offset.

As another example, the second shift information can be the relative position indicating information. Specifically, the relative position indicating information indicates the second shift amount by which the initial physical channel resource group is offset. The second determination module 720 can determine the second shift amount according to the number of the existing mobile stations allocated to each physical resource block, so that the offset initial physical channel resource group is located at the physical resource block where the number of the existing mobile stations is smaller or there is no existing mobile station. The physical resource block where the number of the existing mobile stations is smaller can be the resource block where the indicating channel corresponding to PUSCH is located, and as discussed above, the physical resource block where there is no existing mobile station may be the resource block where the indicating channel corresponding to PUCCH is located. The resource group offset unit 620 can add up the first shift amount and the second shift amount so as to obtain the third shift amount, and offset the initial physical channel resource group by the third shift amount.

Preferably, when there are a plurality of mobile stations, the number of the mobile stations which use the absolute position indicating information and the number of the mobile stations using relative position indicating information can be determined according to the number of the Physical Uplink Control Channels (PUCCH) in the uplink subframes. For example, when the number of the PHCCH is larger than or equal to the predetermined number of the PUCCH, in all of the mobile stations which communicate with the wireless base station, the second shift information of the mobile stations that occupies a first proportion of the total number of the mobile stations can be set as the absolute position indicating information; and when the number of the PUCCH is smaller than the predetermined number of the PUCCH, in all of the mobile stations which communicate with the wireless base station, the second shift information of the mobile stations that occupies a second proportion of the total number of the mobile stations can be set as the absolute position indicating information, wherein the first proportion is larger than the second proportion. That is, the more the number of the PUCCH in the uplink subframes is, the more the number of the mobile stations whose second shift information is set as the absolute position indicating information by the wireless base station is, and the less the number of the mobile stations whose second shift information is set as the relative position indicating information by the wireless base station is; while the less the number of the PUCCH in the uplink subframes, the less the number of the mobile stations whose second shift information is set as the absolute position indicating information by the wireless base station is, and the more the number of the mobile stations whose second shift information is set as the relative position indicating information by the wireless base station is.

Then, the cyclic shift information determination unit 630 can determine the cyclic shift information of the demodulation reference signal used for the mobile station according to unused physical channel resources in the offset physical channel resource group. At last, the transmitting unit 640 transmits the resource group offset information and the cyclic shift information to the mobile station.

According to an example of the present invention, the transmitting unit 640 can inform the mobile station of the DCI order and the cyclic shift information through the scheduling grant signaling. Furthermore, according to another example of the present invention, in the case that the resource group offset information includes the second shift information discussed above, the transmitting unit 640 can transmit the said second shift information to the mobile station through the RRC signaling. In this case, the transmitting unit 640 can first transmit the said second shift information to the mobile station through the RRC signaling, and then inform the mobile station of the DCI order and the cyclic shift information through the scheduling grant signaling.

Furthermore, according to another example of the present invention, after the wireless base station transmits the resource group offset information and the cyclic shift information to the mobile station so that the mobile station determines the physical channel resource which the mobile station can use, the transmitting unit 640 can also include transmitting, to the mobile station, the response information for the signal from the mobile station through the physical channel resource which is determined according to the resource group offset information and the cyclic shift information of the mobile station.

Figure 8:
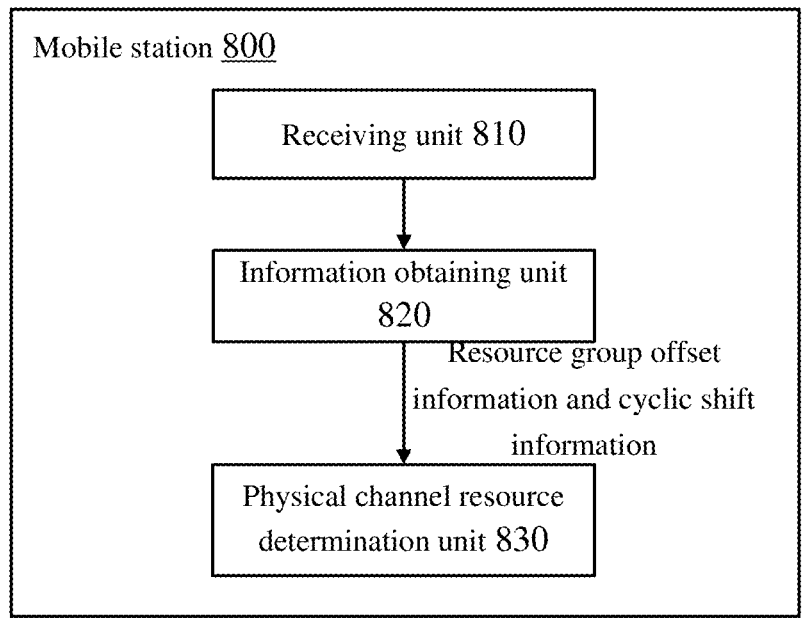
FIG. 8 illustrates a block diagram of an exemplary structure of the mobile station according to an embodiment of the present invention.

Hereinafter, a mobile station of an embodiment of the present invention will be described with reference to FIG. 8. FIG. 8 illustrates a block diagram of an exemplary structure of a mobile station 800 according to the embodiment of the present invention. As shown in FIG. 8, the mobile station 800 of the present embodiment includes a receiving unit 810, an information obtaining unit 820 and a physical channel resource determination unit 830. The respective units of the mobile station 800 can separately perform each step/function of the mobile communication method 400 in the above FIG. 4. Therefore, the following description only describes the main components of the mobile station 800 while the detail content that has been described above in combination with FIG. 4 will be omitted.

For example, the receiving unit 810 can receive the signaling from the wireless base station. The information obtaining unit 820 can obtain the resource group offset information and the cyclic shift information of the demodulation reference signal of the mobile station according to the received signaling. Then, the physical channel resource determination unit 830 can determine the physical channel resource which the mobile station uses for receiving the response information from the wireless base station according to the resource group offset information and the cyclic shift information. Preferably, when the wireless communication system uses the multiplexing manners of both frequency division multiplexing and code division multiplexing, the physical channel resource determination unit 830 my offset, only in frequency domain, the physical channel resource group initially allocated to the mobile station according to the resource group offset information.

According to an example of the present invention, the information obtaining unit 820 can obtain the DCI order of the mobile station according to the received signaling, and determine the resource group offset information according the DCI order. The physical channel resource determination unit 830 can obtain the physical channel resource which the mobile station uses for receiving the response information from the wireless base station by moving the initial physical channel resource group, which is initially allocated to the mobile station by the wireless base station, by the shift amount indicated by the DCI order. Thus, without receiving additional parameters, the mobile station can determine the offset of the initial physical channel resource group initially allocated to the said mobile station by the wireless base station, and can further determine the physical channel resource used for receiving the response information from the wireless base station in the offset initial physical channel resource group.

However, as discussed above, because the value of the DCI order is usually smaller, when the wireless base station offsets the initial physical channel resource group of the mobile station by a larger shift, it is not enough to indicate the position of the offset initial physical channel resource group only by the DCI order.

Figure 9:
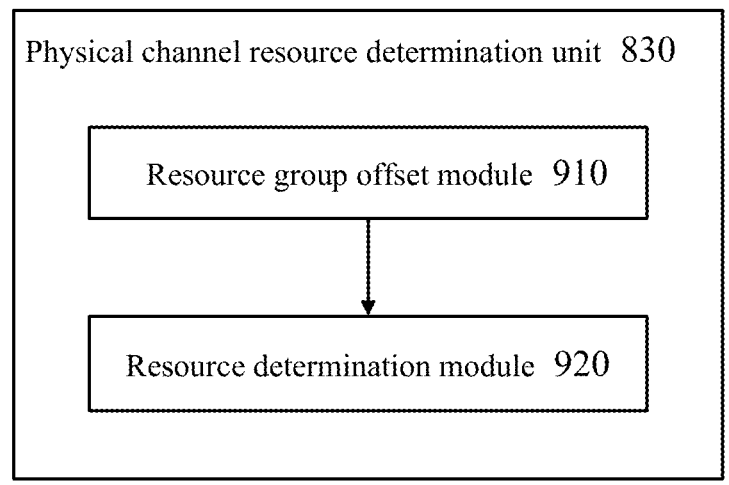
FIG. 9 illustrates a block diagram of an exemplary structure of physical channel resource determination unit according to an embodiment of the present invention.

In order to solve the above problem, according to another example of the present invention, the information obtaining unit 820 can obtain the first shift information and the second shift information as the resource group offset information according to the received signaling, wherein the first shift information is the DCI order of the mobile station and indicates the first shift amount by which the initial physical channel resource group is offset. Therefore, when the wireless base station adjusts the position of the initial physical channel resource group within a larger range, not only is the initial physical channel resource group offset based on the DCI order, but also the offset position of the initial physical channel resource group is determined base on the second shift information at the mobile station side. In this case, as shown in FIG. 9, the physical channel resource determination unit 830 can include a resource group offset module 910 and a resource determination module 920.

For example, the second shift information can be the absolute position indicating information. Specifically, the absolute position indicating information can indicate the target physical resource block to which the initial physical channel resource group is offset. Because PUCCH in the uplink subframes does not need a corresponding indicating channel thereof, that is, the physical channel resource of the indicating channel corresponding to PUCCH is idle, the target physical resource block indicated by the absolute position indicating information can be one of the physical resource blocks which are allocated to the indicating channel of PUCCH in uplink subframes. For example, the indicating channel corresponding to the PUCCH in the uplink subframes can be the physical HARQ indicating channel.

In this case, the resource group offset module 910 can offset the initial physical channel resource group allocated to the mobile station to the target physical resource block, and then, further offset, in the target physical resource block, the initial physical channel resource group by the first shift amount. At last, the resource determination module 920 can determine the physical channel resource in the offset physical channel resource group according to the received cyclic shift information.

As another example, the second shift information can be the relative position indicating information. Specifically, the relative position indicating information indicates the second shift amount by which the initial physical channel resource group is offset. The second shift amount can indicate the physical resource block where the number of the existing mobile stations is smaller or there is no existing mobile station. The physical resource block where the number of the existing mobile stations is smaller can be the resource block where the indicating channel corresponding to Physical Uplink Shared Channel (PUSCH) is located, and as discussed above, the physical resource block where there is no existing mobile station may be the resource block where the indicating channel corresponding to Physical Uplink Control Channel (PUCCH) is located.

In this case, the resource group offset module 910 can add up the first shift amount and the second shift amount so as to obtain the third shift amount, and then move the initial physical channel resource group by the third shift amount. The resource determination module 920 can determine the physical channel resource in the offset physical channel resource group according to the cyclic shift information.

According to an example of the present invention, the receiving unit 810 can receive the scheduling grant signaling. Then, the information obtaining unit 820 can obtain the DCI order and the cyclic shift information of the mobile station through the scheduling grant signaling. Furthermore, according to another example of the present invention, in the case that the resource group offset information includes the above discussed second shift information, the receiving unit 810 can receive RRC signaling. Then, the information obtaining unit 820 can obtain the second shift information according to the received RRC signaling. In this case, the receiving unit 810 can first receive RRC signaling, and the information obtaining unit 820 obtains the second shift information according to the received RRC signaling. Then, the receiving unit 810 can receive the scheduling grant signaling, and the information obtaining unit 820 obtain the second shift information according to the received the scheduling grant signaling. At last, the information obtain unit 820 determines the physical channel resource which the mobile station uses for receiving the response information from the wireless base station according to the first shift information, the second shift information and the cyclic shift information.

Through the wireless base station and the mobile station in the above embodiments of the present invention, more users can be multiplexed in the same physical resource block, and the number of the mobile stations allocated to each physical resource block can be adjusted, so that when the number of the mobile stations allocated to the same physical resource block is larger, a portion of the mobile stations are adjusted to occupy physical channel resources of other physical resource blocks, so as to avoid confliction between the physical channel resources which respective mobile stations use.

Those ordinary skilled in the art can appreciate that the units, modules and algorithm steps in respective examples described in combination with the embodiments enclosed herein can be realized as electronic hardware, computer software, or a combination of both. Moreover, the computer software may be embodied in any form of computer storage medium. In order to clearly describe interchangeability of hardware and software, the compositions and steps of the respective examples have already been generally described according to functions in the above description. Whether these functions are performed as hardware or software depends on particular applications of the technical solution and design constraints. Those skilled in the art can use different method for every particular application to realize the functions described, whereas this realization should not be considered as beyond the scope of the present invention.

Those skilled in the art should understand that various modifications, combinations, subcombinations and replacements can be made to the present invention based on design requirements and other factors, as long as they are in the scope of the appended claims and equivalents thereof.

What is claimed is:

1. A mobile communication method applied to a wireless base station, the method comprising:
   determining resource group offset information used for a mobile station;
   offsetting an initial physical channel resource group allocated to the mobile station according to the resource group offset information;
   determining cyclic shift information of demodulation reference signal used for the mobile station according to unused physical channel resources in the offset physical channel resource group; and
   transmitting the resource group offset information and the cyclic shift information to the mobile station,
   wherein the determining resource group offset information used for a mobile station comprises:
   determining an order of downlink control information (DCI) of the mobile station in scheduling grant signaling, and determining the resource group offset information according to the order of DCI in the scheduling grant signaling.

2. The method according to claim 1, wherein the determining the resource group offset information according to the order of DCI in the scheduling grant signaling comprises:
   determining a first shift information of a first shift amount by which the initial physical channel resource group is offset according to the order of DCI in the scheduling grant signaling;
   the determining resource group offset information to be used by a mobile station further comprises:
   determining second shift information of the mobile station, wherein the second shift information is absolute position indicating information or relative position indicating information; and
   using the first shift information and the second shift information as the resource group offset information used for the mobile station.

3. The method according to claim 2, wherein
   the second shift information is the absolute position indicating information, wherein
      the absolute position indicating information indicates a target physical resource block to which the initial physical channel resource group is offset, wherein the target physical resource block is one of physical resource blocks which are allocated to an indicating channel of physical uplink control channel (PUCCH) in uplink subframes, and
   the offsetting an initial physical channel resource group allocated to the mobile station according to the resource group offset information comprises:
      offsetting the initial physical channel resource group to the target physical resource block, and
      further offsetting the initial physical channel resource group by the first shift amount in the target physical resource block.

4. The method according to claim 2, wherein
   the second shift information is the relative position indicating information, wherein
      the relative position indicating information indicates a second shift amount by which the initial physical channel resource group is offset, and
   the offsetting an initial physical channel resource group allocated to the mobile station according to the resource group offset information comprises:
      adding up the first shift amount and the second shift amount so as to obtain a third shift amount, and
      offsetting the initial physical channel resource group by the third shift amount.

5. The method according to claim 2, wherein
   when there are a plurality of mobile stations, the number of the mobile stations using the absolute position indicating information and the number of the mobile stations using the relative position indicating information is determined according to the number of Physical Uplink Control Channel (PUCCH) in uplink subframes.

6. The method according to claim 2, wherein the transmitting the resource group offset information to the mobile station comprises:
   transmitting the second shift information to the mobile station through a Radio Resource Control (RRC) signaling.

7. The method according to claim 1, wherein the offsetting an initial physical channel resource group allocated to the mobile station according to the resource group offset information comprises:

in frequency domain, offsetting physical channel resource group initially allocated to the mobile station according the resource group offset information.

8. The method according to claim 1, further comprising:
transmitting, to the mobile station, response information for a signal from the mobile station through physical channel resource which is determined according to the resource group offset information and the cyclic shift information of the mobile station.

9. A mobile communication method applied to a mobile station, the method comprising:
receiving a signaling from a wireless base station;
obtaining cyclic shift information of demodulation reference signal and resource group offset information of the mobile station according to the received signaling;
determining physical channel resource which the mobile station uses for receiving response information from the wireless base station according to the resource group offset information and the cyclic shift information,
wherein the obtaining resource group offset information of the mobile station according to the received signal comprises:
obtaining an order of Downlink Control Information (DCI) of the mobile station in scheduling grant signal according to the received signaling, and determining the resource group offset information according to the order of the DCI in the scheduling grant signal.

10. The method according to claim 9, wherein
the determining the resource group offset information according to the order of the DCI in the scheduling grant signal comprises:
determining a first shift information of the resource group offset information according to the order of the DCI in the scheduling grant signal;
the obtaining resource group offset information of the mobile station according to the received signaling further comprises:
obtaining a second shift information of the resource group offset information according to the received signaling, wherein
a first shift amount by which an initial physical channel resource group of the mobile station is offset is determined according to the order of the DCI in the scheduling grant signal.

11. The method according to claim 10, wherein
the second shift information is absolute position indicating information, wherein
the absolute position indicating information indicates a target physical resource block to which the initial physical channel resource group is offset, wherein the target physical resource block is one of physical resource blocks which are allocated to an indicating channel of Physical Uplink Control Channel (PUCCH) in uplink subframes, and
the determining physical channel resource which the mobile station uses for receiving response information from the wireless base station according to the resource group offset information and the cyclic shift information comprises:
offsetting the initial physical channel resource group allocated to the mobile station by the wireless base station to the target physical resource block,
further offsetting the initial physical channel resource group by the first shift amount in the target physical resource block, and
determining the physical channel resource in the offset physical channel resource group according to the cyclic shift information.

12. The method according to claim 10, wherein
the second shift information is relative position indicating information, wherein
the relative position indicating information indicates a second shift amount by which the initial physical channel resource group is offset, and
the determining physical channel resource which the mobile station uses for receiving response information from the wireless base station according to the resource group offset information and the cyclic shift information comprises:
adding up the first shift amount and the second shift amount so as to obtain a third shift amount,
offsetting the initial physical channel resource group by the third shift amount, and
determining the physical channel resource in the offset physical channel resource group according to the cyclic shift information.

13. A wireless base station, comprising:
a resource group offset information determination unit, configured to determine resource group offset information used for a mobile station;
resource group offset unit, configured to offset an initial physical channel resource group allocated to the mobile station according to the resource group offset information;
an cyclic shift information determination unit, configured to determine an cyclic shift information of an demodulation reference signal used for the mobile station according to unused physical channel resources in the offset physical channel resource group; and
a transmitting unit, configured to transmit the resource group offset information and the cyclic shift information to the mobile station,
wherein the resource group offset information determination unit determines an order of Downlink Control Information (DCI) of the mobile station in scheduling grant signaling, and determines the resource group offset information according to the order of the DCI in the scheduling grant signaling.

14. The wireless base station according to claim 13, wherein the resource group offset information determination unit comprises:
a first determination module, configured to determine a first shift information of a first shift amount by which the initial physical channel resource group is offset according to the order of the DCI in the scheduling grant signaling;
a second determination module, setting a second shift information of the mobile station, wherein the second shift information is absolute position indicating information or relative position indicating information; and
a third determination module, configured to use the first shift information and the second shift information as the resource group offset information used for the mobile station.

15. The wireless base station according to claim 14, wherein
the second shift information is the absolute position indicating information, wherein
the absolute position indicating information indicates a target physical resource block to which the initial physical channel resource group is offset, wherein the target physical resource block is one of physical resource blocks which are allocated to an indicating channel of Physical Uplink Control Channel (PUCCH) in uplink subframes, and the resource group offset unit offsets the initial physical channel resource group to the target physical resource block, and further offset the initial physical channel resource group by the first shift amount in the target physical resource block.

16. The wireless base station according to claim 14, wherein the second shift information is the relative position indicating information, wherein the relative position indicating information indicates a second shift amount by which the initial physical channel resource group is offset, and the resource group offset unit adds up the first shift amount and the second shift amount so as to obtain a third shift amount, and offsets the initial physical channel resource group by the third shift amount.

17. The wireless base station according to claim 14, wherein when there are a plurality of the mobile stations, the second determination module determines the number of the mobile stations using the absolute position indicating information and the number of the mobile stations using the relative position indicating information according to the number of Physical Uplink Control Channels (PUCCH) in uplink subframes.

* * * * *